W. C. CONANT.
SPEED CHANGING MECHANISM.
APPLICATION FILED MAR. 4, 1911.

1,015,477.

Patented Jan. 23, 1912.
4 SHEETS—SHEET 1.

Witnesses:

Inventor:
William C. Conant,

W. C. CONANT.
SPEED CHANGING MECHANISM.
APPLICATION FILED MAR. 4, 1911.

1,015,477.

Patented Jan. 23, 1912.
4 SHEETS—SHEET 2.

Witnesses:
Inventor:
William C. Conant,

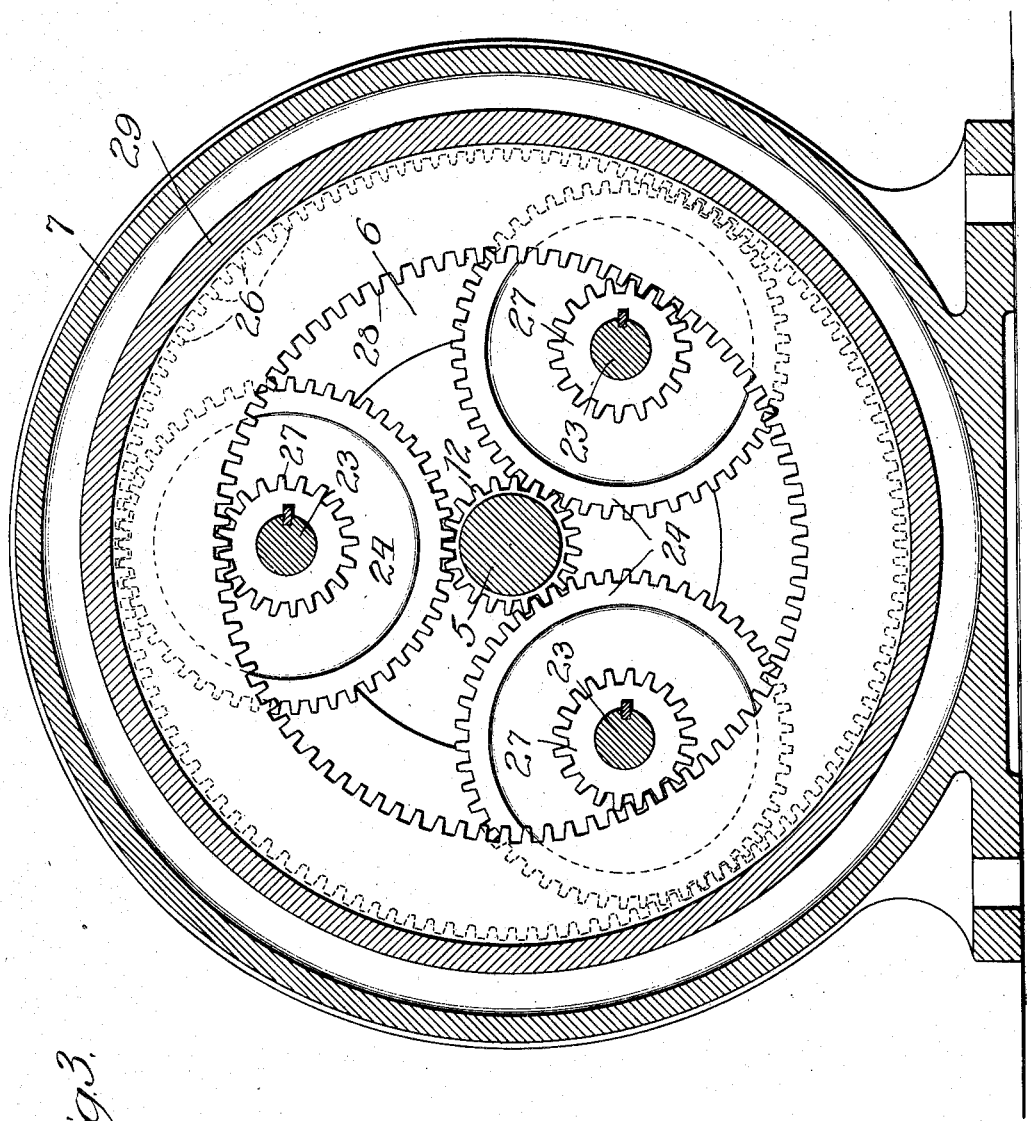

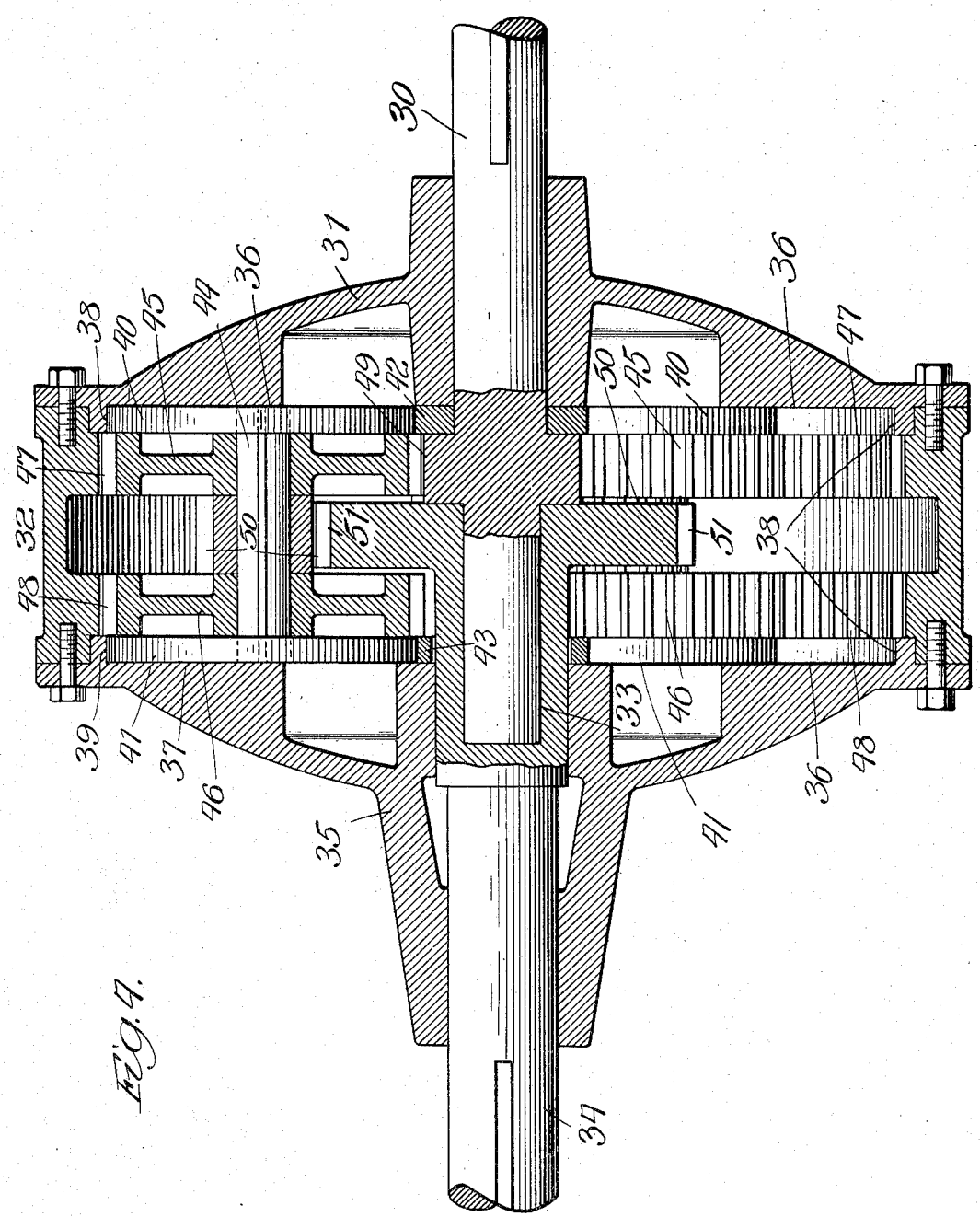

UNITED STATES PATENT OFFICE.

WILLIAM C. CONANT, OF RIVERSIDE, ILLINOIS.

SPEED-CHANGING MECHANISM.

1,015,477.   Specification of Letters Patent.   Patented Jan. 23, 1912.

Application filed March 4, 1911. Serial No. 612,348.

*To all whom it may concern:*

Be it known that I, WILLIAM C. CONANT, a citizen of the United States, residing at Riverside, in the county of Cook and State of Illinois, have invented a new and useful Improvement in Speed - Changing Mechanism, of which the following is a specification.

My invention relates, more particularly, to improvements in speed-changers for affecting transmission of power from a drive to a driver member in line with each other, this type of mechanism involving, generally stated, a combination of intermeshing gears operatively connected with the drive and driven members and operating to transmit the power from the drive member to the driven member to drive the latter at the desired speed.

My primary object is to provide a novel and simple construction of gear transmission mechanism of the planetary type by which any desired speed change and maximum power transmission may be effected, and which, in operation, balances the forces between the drive and driven shafts.

My invention is illustrated in the accompanying drawings, in which—

Figure 1:
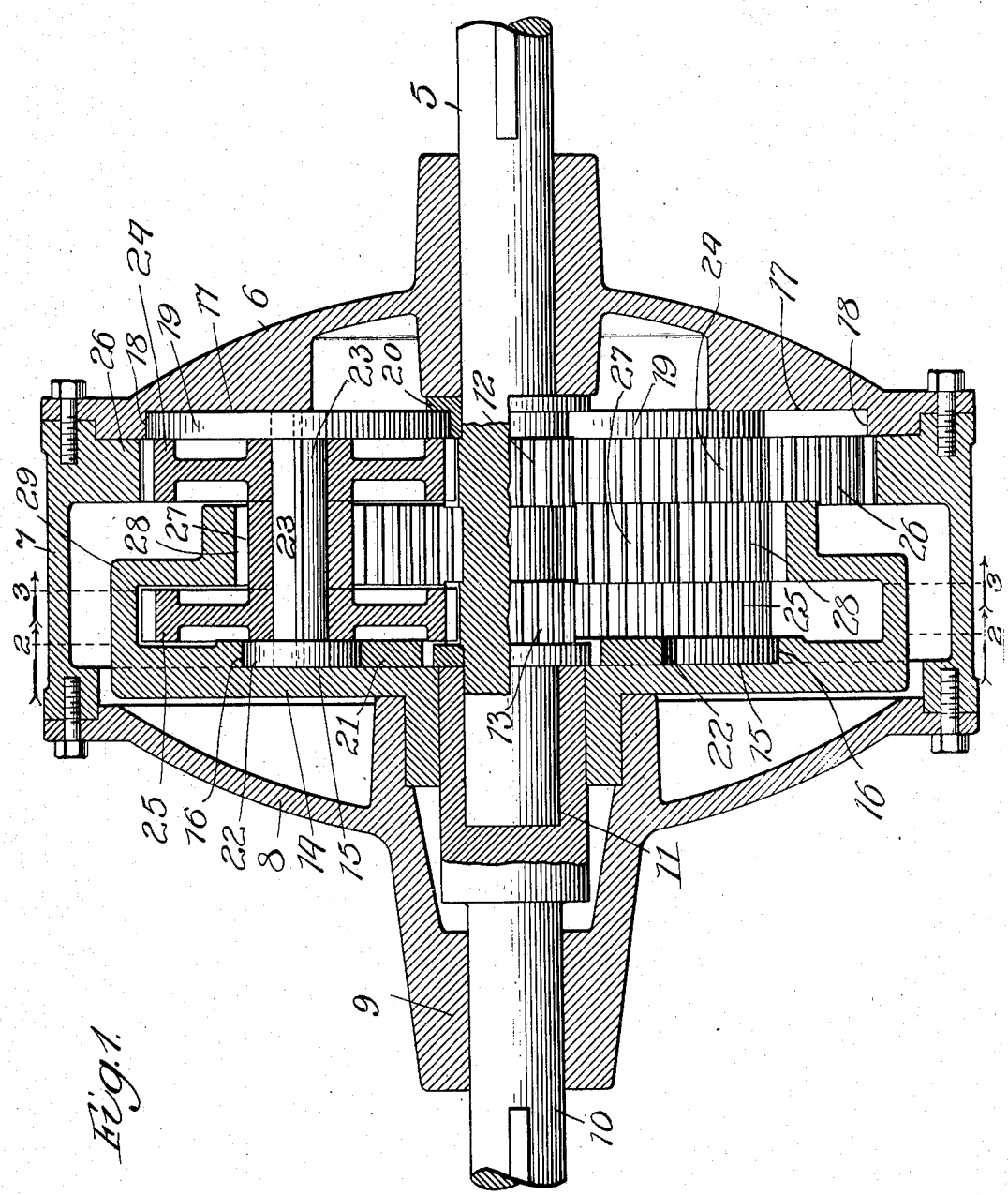
Figure 2:
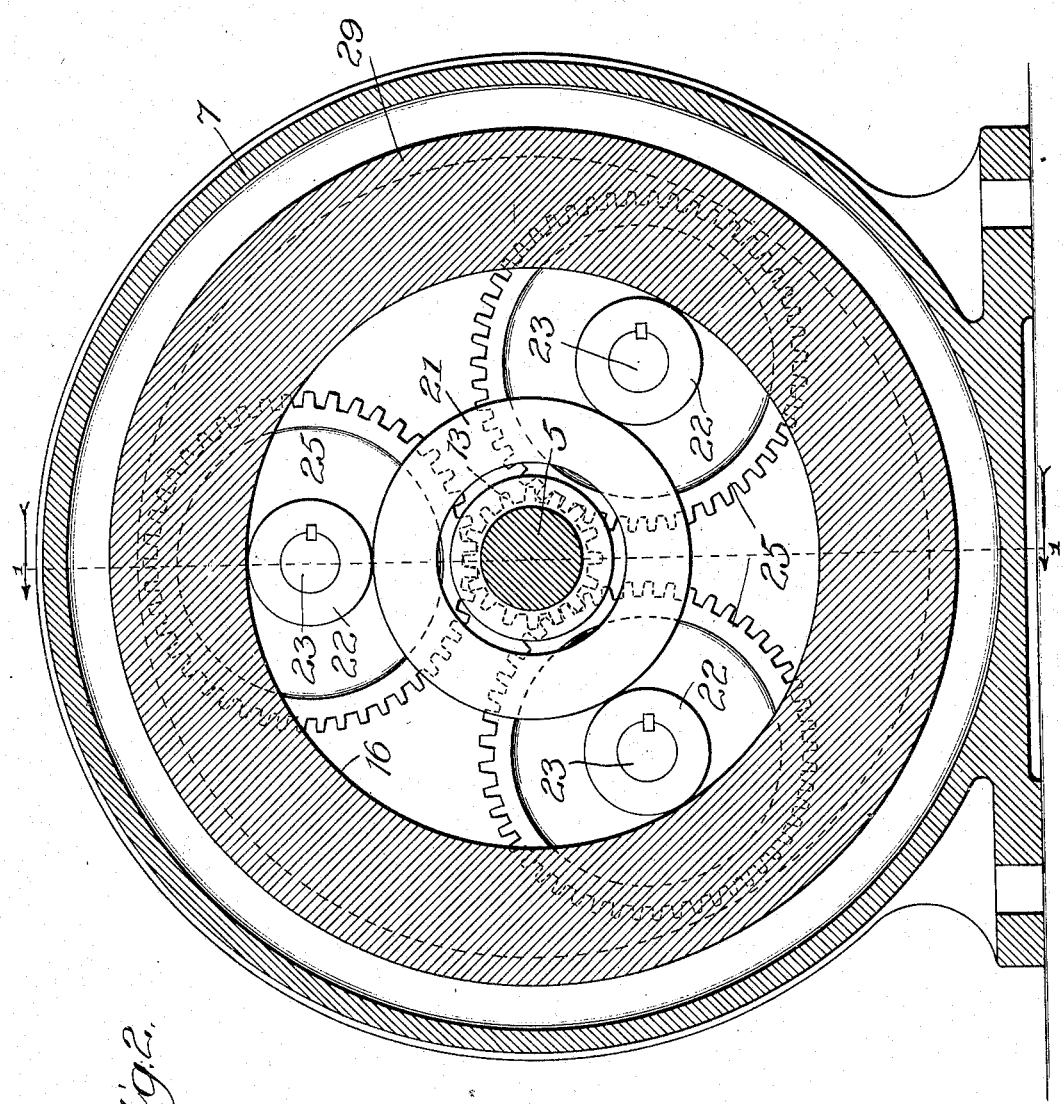

Figure 1 is a view in longitudinal sectional elevation of one form in which my invention may be embodied; Figs. 2 and 3 are sections taken at the lines 2 and 3, respectively, on Fig. 1 and viewed in the direction of the arrows; and Fig. 4, a view like Fig. 1 of another form in which my invention may be embodied.

Referring to Figs. 1, 2 and 3 of the drawings, the drive-shaft, which may be the draft-shaft of an electric motor, or any other power-device, is represented at 5 and is journaled intermediate its ends in a side wall 6 of a stationary casing 7, the opposed wall 8 of which casing forms a journal-bearing 9 for the driven-shaft 10, which is in alinement with the shaft 5. The inner end of the shaft 5 extends into the plane occupied by the side wall 8 and is preferably journaled in a socket 11 in the inner, enlarged end of the shaft 10, whereby a rigid bearing for the inner end of the shaft 5 is afforded. Fixed on the shaft 5 are pinions 12 and 13 which are of the same size and are spaced apart as represented in Fig. 1. The casing 7 is equipped with a stationary internal gear 26 and the driven-shaft carries a disk 14 provided with a flange-portion 29 terminating in an internal gear 28. Interposed between the gears 12 and 26 and meshing therewith is a series of gears 24, shown as three in number, though the number thereof may be varied as desired, the gears 24 being represented as fixed on shafts 23. Rigid on the same shafts 23, to be rotated by the gears 24, are gears 25 which are of the same size as the gears 24 and mesh with the pinion 13, and secured on the shafts 23 intermediate each set of gears 24 and 25 are pinions 27 meshing with the gear 28 on the driven-shaft.

It will be understood from the foregoing that planetary gear-mechanism is thereby interposed between the drive and driven shafts, and that when power is applied to the shaft 5 it is rotated and in turn rotates, through the pinions 12 and 13, the gears 24 and 25, and, by reason of the engagement of the gears 24 with the stationary gear 26, causes the gears 24 and 25 and pinions 27 to revolve both about the shaft 5, and the axes of their own shafts 23, the pinions 27 being in mesh with the gear 28, imparting to the latter a part of this compound rotation, thus driving the shaft 10, the speed at which the driven-shaft is rotated with relation to the shaft 5 depending upon the relative proportions of the gearing.

It is necessary that some means be provided for maintaining the gears 24, 25 and 27 in proper intermeshing position with relation to the gears 12, 13, 26 and 28, and as desirable means for this purpose those illustrated are provided, of which the following is a description.

Fixed on opposite ends of each shaft 23 is a roller 19 and a roller 22, these rollers being of the same diameters as the pitch diameters of the gears 24 and 27, respectively. The rollers 19 extend into an annular recess 17 formed in the inner face of the casing-wall 6, these rollers bearing against the annular surface 18 of the recess 17, which is of the same diameter as the pitch diameter of the gear 26, and a roller 20 of the same diameter as the pitch diameter of the pinion 12. The rollers 22 extend into an annular recess 15 formed in a face of the disk 14, these rollers being confined between a ring 11 and the annular surface 16 of the recess 15 which is of the same diameter as the pitch diameter of the gear 28.

By virtue of the roller construction referred to, the floating gears are maintained in proper mesh with their coöperating gears during the operation of the mechanism and are free to revolve about the shaft 5, as the rollers have perfect rolling contact with their coöperating tracks.

In the construction illustrated in Fig. 4, the drive-shaft, which is represented at 30, carries a pinion 49 and is journaled in a wall 31 of the casing represented at 32, the inner end of this shaft being journaled in a socket 33 in the inner end of the drive-shaft 34 which is journaled in the opposite casing-wall 35 in alinement with the shaft 30 and carries a gear 51. Meshing with the gear 49 and with an internal stationary gear 47 on the casing 32 are gears 45 arranged in an annular series and rigidly secured to shafts 44. Secured on the shafts 44 and spaced from the gears 45 are gears 46 which are of the same size as the gears 45 and mesh with an internal stationary gear 48 on the casing 32; and interposed between the gears 45 and 46 of each set thereof and fixed on the shafts 44 are pinions 50 which mesh with the gear 51.

It will be understood from the foregoing that the drive and driven shafts are connected together by planetary gear-mechanism, and that when the shaft 30 is driven, it will rotate the pinion 49, thereby rotating the gears 45, and causing them, together with the gears 46 and pinions 50 to revolve about the shaft 30, by reason of the engagement of the gears 45 and 46 with the stationary gears 47 and 48, respectively. The pinions 50 being in mesh with the gear 51, cause the latter to rotate and thus drive the shaft 34, the speed at which the shaft 34 is rotated with relation to the drive-shaft 30 depending upon the relative proportions of the gearing. In this construction, the gears 45, 46 and 50 are maintained in the desired intermeshing position with relation to the gears 49, 47, 48 and 51, by means of rollers 40 and 41, which are connected with the ends of the shafts 44 and extend into annular recesses 36 and 37 in the casing sides 31 and 35, respectively, these rollers being of the same diameter as the pitch diameters of the gears 45 and 46. The rollers 40 are confined in the recesses 36 between the outer annular wall 38 thereof and a ring 42 fixed on the shaft 30; and the rollers 41 are confined between the outer annular wall 39 of the recess 37 and a ring 43 surrounding, but disconnected from, the shaft 34, the walls 38 and 39 and rings 42 and 43 forming tracks against which the rollers 40 and 41, respectively, bear, and thereby maintain proper intermeshing engagement between the coöperating gears in the operation of the mechanism as described.

It will be understood from the foregoing that the force exerted between the drive and driven shafts, in both of the constructions illustrated, is communicated from the gear on the driven shaft to its intermeshing pinions, and thence to the gears arranged on opposite sides of the latter and rotatable therewith, and that these last referred to gears by intermeshing with other gears as described, serve to balance the force exerted by the resisting load and thereby cause all of such force to be absorbed by the gear mechanism. It will be apparent that the gears 12 and 13 may be merged into one gear without departing from the scope of my invention as claimed, and this is also true of the gears 47 and 48, the gears referred to being formed separately, mainly as a matter of economy of construction.

While I have shown constructions in which the planetary gear mechanisms are each formed with three sets of floating gears, I do not wish to be understood as intending to limit my invention to a construction in which this particular number of sets of gears are employed, as the number thereof may be changed, as desired. Furthermore, while I have described the shafts 5 and 30 as drive-shafts and the shafts 10 and 34 as driven-shafts, whereby the mechanism operates as a speed reducer, it will be readily understood that the driving power may be applied to the shafts 10 and 34, the mechanisms thereby becoming speed-multipliers and serving to drive the driven-shafts at a greater speed than that at which the drive-shafts operate, such reversal of operation being clearly within my invention. Furthermore, the constructions illustrated may be otherwise obviously modified and altered without departing from the spirit of my invention.

What I claim as new, and desire to secure by Letters Patent, is—

1. In speed-changing mechanism, the combination with alining drive and driven members, of planetary gear-mechanism operatively connecting said members together for driving said driven member at a different rate of speed than that at which said drive-member rotates, and additional gear-mechanism operating, in conjunction with said planetary gear-mechanism to balance the forces between the drive and driven members.

2. In speed-changing mechanism, the combination with alining drive and driven members, of planetary gear-mechanism, comprising a stationary gear concentric with the axis upon which said members rotate, a gear connected with said drive-member, a gear connected with said driven member and gears of different diameters connected together and having a common axis of rotation, one of said last-named gears meshing with the gear on one of said members and with said stationary gear, and the other of said last-named gears meshing with the gear on the other of said members, and additional gear-mechanism operating, in conjunction with said planetary gear-mechanism, to balance the entire force exerted between the drive and driven members.

3. In speed-changing mechanism, the combination with alining drive and driven members, of planetary gear-mechanism comprising a stationary gear concentric with the axis upon which said members rotate, a gear connected with said drive-member, a gear connected with said driven member, and sets of gears grouped about said axis, the gears of each set thereof being connected together and having a common axis of rotation, one of the gears of each set thereof meshing with the gear on one of said members and with said stationary gear, and the other of the gears of each set thereof meshing with the gear on the other of said members, and additional gear-mechanism operating, in conjunction with said first-named gear-mechanisms, to balance the forces exerted between said drive and driven members.

4. In speed-changing mechanism, the combination with alining drive and driven members, of planetary gear-mechanism comprising gears connected with said members, a stationary gear concentric with the axis upon which said members rotate, and gears connected together and having a common axis of rotation, one of said last-named gears meshing with the gear on one of said members and with said stationary gear, and the other of said last-named gears meshing with a gear on the other of said members, and means for maintaining said last-named gears in proper intermeshing position with the gears on said drive and driven members and said stationary gear, comprising circular tracks spaced apart and arranged concentric with the axes upon which said members rotate, and rollers bearing against said tracks and connected, and in axial alinement, with said last-named gears.

5. In speed-changing mechanism, the combination with alining drive and driven members, of a gear connected with one of said members, gears connected with the other of said members, a stationary gear concentric with the axis upon which said members rotate, and gears connected together and having a common axis of rotation one of said last-named gears meshing with one of said second-named gears and with said stationary gear, another of said last-named gears meshing with said first-named gear, and the other of said last-named gears meshing with the other of said second-named gears, for the purpose set forth.

6. In speed-changing mechanism, the combination with alining drive and driven members, of a gear connected with one of said members, gears connected with the other of said members, a stationary internal gear concentric with the axis upon which said members rotate, and gears connected together and having a common axis of rotation, one of said last-named gears meshing with one of said second-named gears and with said stationary gear, another of said last-named gears meshing with said first-named gear, and the other of said last-named gears meshing with the other of said second-named gears, for the purpose set forth.

7. In speed-changing mechanism, the combination with alining drive and driven members, of a gear connected with one of said members, gears connected with the other of said members, a stationary gear concentric with the axis upon which said members rotate, and gears connected together and having a common axis of rotation and comprising a pair of gears of the same size, and a third gear of different size, said pair of gears meshing, respectively, with one of said second-named gears and with said stationary gear and with the other of said second-named gears, and said third gear meshing with said first-named gear, for the purpose set forth.

8. In speed-changing mechanism, the combination with alining drive and driven members, of a gear connected with one of said members, gears connected with the other of said members, a stationary gear concentric with the axis upon which said members rotate, and sets of gears grouped about said axis, the gears of each set thereof being connected together and having a common axis of rotation, each of said sets of gears being formed of a pair of gears spaced apart and of the same size, and a third gear located between said pair of gears, one of the members of each of the said pairs of gears meshing with one of said second-named gears and with said stationary gear, the other of each of said pairs of gears meshing with the other of said second-named gears, and the third gear of each of said sets of gears meshing with said first-named gear.

9. In speed-changing mechanism, the combination with alining drive and driven members, of a stationary gear concentric with the axis upon which said members rotate, a gear connected with said drive-member, a pair of tracks arranged concentric with said axis, rollers confined against said tracks, a shaft connecting said rollers together, a gear on said driven member, and gear-mechanism carried by said shaft and operatively connecting the gears on said drive and driven members together and constructed and arranged to balance the entire force transmitted between the drive and driven members.

10. In speed-changing mechanism, the combination with alining drive and driven members, of a stationary gear concentric with the axis upon which said members rotate, a gear connected with said drive-member, a pair of tracks arranged concentric with said axis, rollers confined against said tracks, shafts connecting opposed rollers together, a gear on said driven-member, and gear-mechanisms carried by said shafts and operatively connecting the gears on said drive and driven members together and constructed and arranged to balance the entire force transmitted between the drive and driven members.

11. In speed-changing mechanism, the combination with alining drive and driven members, of a gear connected with one of said members, gears connected with the other of said members, a stationary gear concentric with the axis upon which said members rotate, a plurality of concentrically disposed tracks, rollers confined against said tracks, a shaft connecting said rollers together, and gears carried by said shaft and connected together and having a common axis of rotation, one of said last-named gears meshing with one of said second-named gears and with said stationary gear, another of said last-named gears meshing with the other of said second-named gears, and the other of said last-named gears meshing with said first-named gear, for the purpose set forth.

12. In speed-changing mechanism, the combination with alining drive and driven members, a gear connected with one of said members, gears connected with the other of said members, a stationary gear concentric with the axis upon which said members rotate, a plurality of concentrically-disposed tracks, rollers confined against said tracks, a shaft connecting said rollers together, and gears carried by said shaft and connected together and having a common axis of rotation and comprising a pair of gears of the same size and a third gear of different size, said third gear meshing with said first-named gear, and said pair of gears meshing with one of said second-named gears and with said stationary gear and with the other of said second-named gears, respectively, for the purpose set forth.

13. In speed-changing mechanism, the combination with alining drive and driven members, of a gear carried by one of said members, gears carried by the other of said members, a stationary gear concentric with the axis upon which said members rotate, a stationary track concentric with said axis, a track carried by one of said members, rollers of different diameters confined against said tracks, a shaft connecting said rollers together, and gears carried by said shaft and connected together and having a common axis of rotation and comprising a pair of gears of the same size, and a third gear of different size, said pair of gears meshing with one of said second-named gears and with said stationary gear and with the other of said second-named gears, respectively, and said third gear meshing with said first-named gear, the rollers engaging with said stationary and rotatable tracks being of the same diameter as the pitch diameters of said pair of gears and said third gear, respectively, for the purpose set forth.

14. In speed-changing mechanism, the combination with alining drive and driven members, of a gear connected with one of said members, gears connected with the other of said members, a stationary gear concentric with the axis upon which said members rotate, a stationary track concentric with said axis, a track carried by said driven member and rotatable therewith, annular series of rollers confined against said tracks, shafts connecting together rollers of different series thereof, and sets of gears carried by said shafts, each of said sets of gears comprising a pair of gears spaced apart and a third gear of different size interposed between and connected with said pair and having a common axis of rotation, one of the gears of each of said pairs meshing with one of said second-named gears and with said stationary gear, the other gear of each of said pairs meshing with the other of said second-named gears, and each of said third gears meshing with said first-named gear, the rollers engaging with said stationary track being of the same diameter as the pitch diameter of said pairs of gears, and the rollers engaging with the track carried by said driven member being of the same diameter as the pitch diameter of said third gears.

15. In speed-changing mechanism, the combination of a drive-member, a driven member and a casing provided with gears, a pair of gears of the same size spaced apart and meshing with the gears on said casing and one of said members, and a third gear located between said pair of gears with its axis of rotation common with the axis upon which the gears of said pair rotate, said third gear being secured to said pair of gears and of a different size and meshing with the gear on the other of said members, the whole being constructed and arranged to cause the driven member to be rotated at a different rate of speed than that at which the drive-member rotates and to effect in the gear-mechanism balancing of the force transmitted between said drive and driven members.

16. In planetary gear-transmission, the combination of a drive and a driven member, concentric gears connected with said members, a planet gear meshing with said concentric gears, concentric tracks, and a roller of the same diameter as the pitch diameter of said planet gear confined against said tracks, for the purpose set forth.

WILLIAM C. CONANT.

In presence of—
A. U. THORIEN,
R. A. SCHAEFER.